US008893683B2

United States Patent
Levy et al.

(10) Patent No.: US 8,893,683 B2
(45) Date of Patent: Nov. 25, 2014

(54) INTAKE SYSTEM FOR AN OPPOSED-PISTON ENGINE

(71) Applicant: EcoMotors, Inc., Allen Park, MI (US)

(72) Inventors: Robert Levy, Dryden, MI (US); Amr Gamal Sami, Cairo (EG)

(73) Assignee: EcoMotors, Inc., Allen Park, MI (US)

(*) Notice: Subject to any disclaimer, the term of this patent is extended or adjusted under 35 U.S.C. 154(b) by 190 days.

(21) Appl. No.: 13/672,741

(22) Filed: Nov. 9, 2012

(65) Prior Publication Data

US 2013/0118441 A1 May 16, 2013

Related U.S. Application Data

(60) Provisional application No. 61/558,490, filed on Nov. 11, 2011.

(51) Int. Cl.

| | | |
|---|---|---|
| F02B 75/32 | (2006.01) | |
| F02M 35/10 | (2006.01) | |
| F16J 1/14 | (2006.01) | |
| F02B 75/04 | (2006.01) | |
| F02B 41/04 | (2006.01) | |
| F02B 75/02 | (2006.01) | |
| F01B 9/02 | (2006.01) | |

(52) U.S. Cl.
CPC ............ *F02M 35/10091* (2013.01); *F16J 1/14* (2013.01); *F02B 75/048* (2013.01); *F02B 41/04* (2013.01); *F02B 2075/025* (2013.01); *F02B 75/32* (2013.01); *F01B 9/023* (2013.01); *Y02T 10/146* (2013.01)
USPC ....................................................... 123/197.4

(58) Field of Classification Search
CPC .... F02B 75/32; F02B 41/04; F02B 2075/025; F02B 75/048; F01B 9/023
USPC ....................................................... 123/197.4
See application file for complete search history.

(56) References Cited

U.S. PATENT DOCUMENTS 3,411,289 A * 11/1968 Antonsen et al. ............. 60/280
5,600,861 A * 2/1997 Saito ............................ 15/88.2

(Continued)

FOREIGN PATENT DOCUMENTS

| FR | 724741 A | 11/1930 |
|---|---|---|
| WO | 96/24757 A1 | 8/1996 |
| WO | 02/48524 A1 | 6/2002 |

OTHER PUBLICATIONS

Hofbauer, Opposed Piston Opposed Cylinder (opoc) engine for Military Ground Vehicles, SAE Paper 2005-01-1548, 2005, pp. 1-41, Warrendale, PA, USA.

*Primary Examiner* — Lindsay Low
*Assistant Examiner* — Charles Brauch
(74) *Attorney, Agent, or Firm* — Diana D. Brehob

(57) ABSTRACT

An opposed-piston engine has a plurality of intake ports wrapped around the cylinder wall. It is desirable to obtain high swirl ratio flow with minimal pressure drop. A system have a generally-volute shaped plenum is disclosed. A centerline of the volute spirals inwardly. Furthermore, the cross-sectional area of the volute decreases in the direction of flow. The area is decreased as the flow from the plenum enters intake ports so that the velocity of flow in the plenum near the downstream end does not slow precipitously. The intake system may have multiple such volute-shaped plena coupled to mutually exclusive subsets of the intake ports. The volute shape leads to a high swirl ratio with limited drop in flow energy.

19 Claims, 6 Drawing Sheets

(56) References Cited

U.S. PATENT DOCUMENTS

| | | |
|---|---|---|
| 6,170,443 B1 | 1/2001 | Hofbauer |
| 6,182,449 B1 | 2/2001 | Halimi |
| 2002/0162449 A1 * | 11/2002 | Futami et al. .................. 92/187 |
| 2010/0229836 A1 * | 9/2010 | Hofbauer et al. .......... 123/51 R |
| 2011/0114070 A1 | 5/2011 | Liu |

* cited by examiner

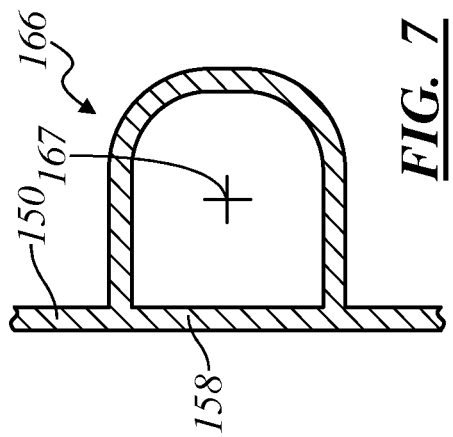
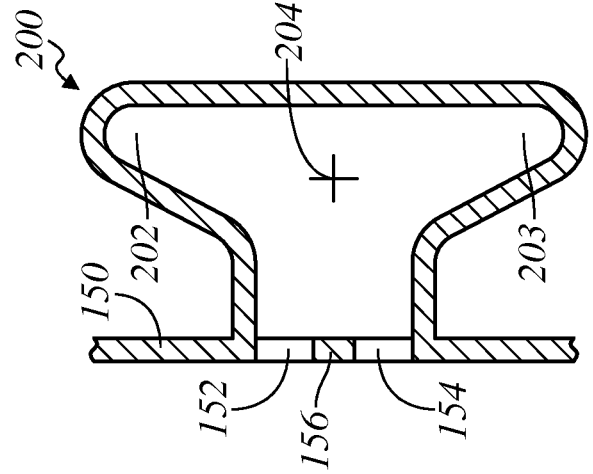
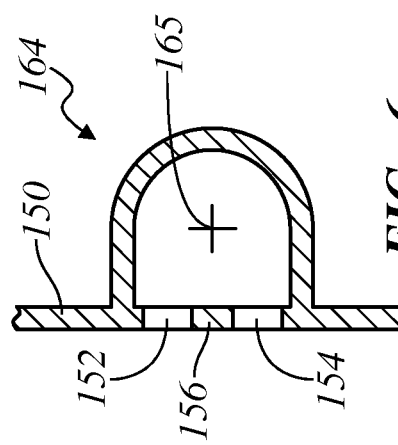
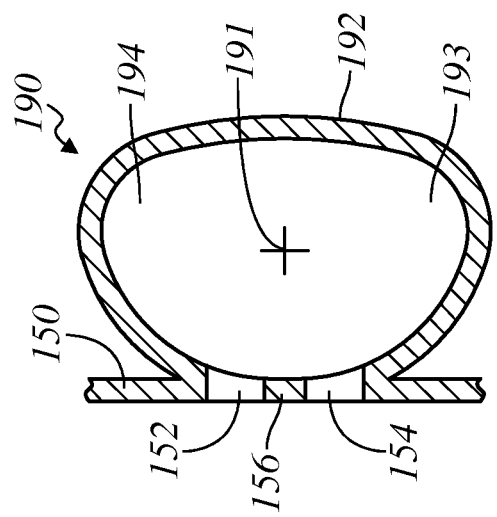
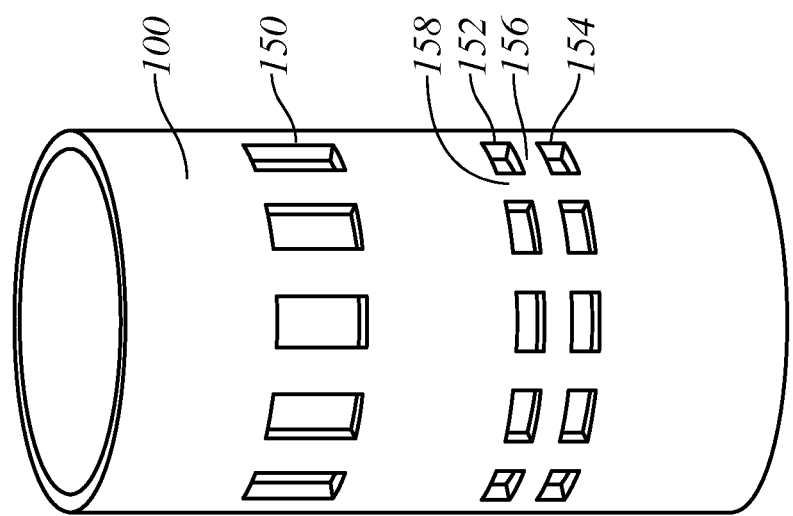

INTAKE SYSTEM FOR AN OPPOSED-PISTON ENGINE

CROSS-REFERENCE TO RELATED APPLICATION

Cross Reference to Related Applications The present application claims priority benefit from U.S. provisional patent application 61/558,490 filed 11 Nov. 2011.

FIELD

The present disclosure relates to an intake system for a two-stroke internal combustion engine.

BACKGROUND

In FIG. 1, an opposed-piston, opposed-cylinder (OPOC) engine 10 is shown isometrically. An intake piston 12 and an exhaust piston 14 reciprocate within each of first and second cylinders (cylinders not shown to facilitate viewing pistons). Exhaust pistons 14 couple to a journal (not visible) of crankshaft 20 via pushrods 16. Intake pistons 12 couple to two journals (not visible) of crankshaft 20 via pullrods 18, with each intake piston 12 having two pullrods 18.

A portion of an opposed-piston engine 110 is shown in cross section in FIG. 2. An intake piston 112 and an exhaust piston 114 reciprocate in cylinder 116. Pistons 112 and 114 are coupled to journals of crankshaft 120 via a pushrod 122 in the case of piston 114 and via a bridge 124 and two pullrods 126 in the case of piston 112. As engine 110 is an opposed-piston, opposed-cylinder (OPOC) engine, crankshaft 120 is also coupled with a pushrod 132 and pullrod 136 that connect to additional pistons (not shown) in another cylinder (not shown) on the other side of crankshaft 120 from pistons 112 and 114. An example of an OPOC engine is described in more detail in U.S. Pat. No. 6,170,443, which is incorporated herein by reference in its entirety.

In FIG. 3, a schematic representation a cross section taken through the intake ports is shown. A cylinder wall 26 has a plurality of intake ports 24 through which the intake air can be inducted from a plenum 28. Also shown in FIG. 3 are tunnels 30 in which pullrods 32 are disposed. Tunnels 30 restrict the size of plenum 28 in regions 34 thereby restricting flow in those regions. Pullrods 32 can be displaced outwardly from the positions shown in FIG. 3. However, this causes the engine to be wider. An alternative configuration at least partially alleviating such compromise between obtaining the desired flow into the engine and maintaining a compact engine is desired.

SUMMARY OF THE DISCLOSURE

To overcome at least one problem in prior systems, an internal combustion engine is disclosed that has: a cylinder wall having a plurality of intake ports defined at a first distance along the cylinder wall and a plurality of exhaust ports defined at a second distance along the cylinder wall, a crankshaft, an intake piston disposed within the cylinder wall and coupled to the crankshaft via a connecting rod with the piston adapted to reciprocate in the cylinder in response to rotation of the crankshaft thereby covering and uncovering the intake ports, and an intake system coupled to the intake ports. The intake system includes: a first generally volute-shaped plenum fluidly coupled to a first portion of the intake ports and a locus of geometric centers of cross sections of the first plenum spirals inwardly with a monotonically decreasing radius as considered in the direction of flow and a second generally volute-shaped plenum fluidly coupled to a second portion of the intake ports and a locus of geometric centers of cross sections of the second plenum spiral inwardly with a generally decreasing radius as considered in the direction of flow. The first and second plena wrap around an outside of the cylinder wall with a direction of flow in the two plena having the same sense. The intake system may further includes a transition section fluidly coupled to the first plenum and located immediately upstream of the first plenum. The transition section generally increases in cross-sectional area in the direction of flow. The intake system may further includes a supply passageway coupled to the transition section and located immediately upstream of the transition section. The supply passageway has a generally constant cross-sectional area.

The engine may also have a second connecting rod coupled to the intake piston, a bridge coupled between the intake piston and the connecting rods with the connecting rods disposed diametrically opposite to each other outside the intake piston, a first connecting rod tunnel housing the first connecting rod, and a second connecting rod tunnel enclosing housing the second connecting rod wherein the first connecting rod tunnel is disposed between the second plenum and the supply passageway. The first and second plena, the ports, the cylinder wall, the connecting rod tunnels, the transition section, and the supply passageway are formed in a single casting in some embodiments. The first and second plena, the transition section, and the supply passageway are generally arranged in a plane perpendicular to a central axis of the cylinder wall or helically along the cylinder wall.

The first plenum and the second plenum are fluidly decoupled upstream of the intake ports.

In some embodiments, a cross sectional shape of the plena includes at least one substantially straight side.

Cross-sectional area of the first plenum, as taken in a plane intersecting a central axis of the cylinder wall, decreases in a direction moving toward the cylinder.

Between adjacent intake ports are vertical bridges that present an upstream face and a downstream face to gases flowing toward intake ports and at least some of the upstream and downstream faces have generally rounded corners. The rounded corners have been shown to reduce the pressure drop of gases flowing through the intake ports thereby improving scavenging properties of the intake system.

Also disclosed in an intake system for a two-stroke, internal-combustion engine having a cylinder have a first set and a second set of intake ports, a first volute-shaped plenum fluidly coupled to the first set of intake ports on an upstream side of the intake ports, and a second volute-shaped plenum fluidly coupled to the second set of intake ports on an upstream side of the intake ports wherein cross-sectional area of first and second volutes generally decreases in a direction of flow wherein the first and second plena are fluidly decoupled upstream of the intake ports. Cross-sectional area is defined at cross sections that intersect a central axis of the cylinder. The first and second plena also include a first intake runner fluidly coupled to the first plenum, and a second intake runner fluidly coupled to the second plenum.

The first set of intake ports and the second set of intake ports are mutually exclusive. The first set of intake ports are arranged circumferentially around the cylinder over about 180 degrees of circumference; and the second set of intake ports are arranged circumferentially around the cylinder over about 180 degrees of circumference.

A centerline of the first plenum spirals inwardly with a monotonically decreasing radius.

A disclosed internal-combustion system includes a cylinder wall having first and second sets of intake ports and a plurality of exhaust ports, a crankshaft, an intake piston disposed within the cylinder wall and coupled to the crankshaft via a connecting rod with the piston adapted to reciprocate in the cylinder in response to rotation of the crankshaft covering and uncovering the intake ports, a first volute-shaped plenum fluidly coupled to the first set of intake ports on an upstream side of the intake ports with a cross-sectional area of the first plenum decreasing monotonically in a direction of flow, and a second volute-shaped plenum fluidly coupled to the second set of intake ports on an upstream side of the intake ports with a cross-sectional area of the second plenum generally decreasing in a direction of the flow for a portion of the second plenum wherein the first and second plena are fluidly decoupled upstream of the intake ports.

The plurality of intake ports comprise a primary plurality of intake ports at a first distance along the cylinder wall and a secondary plurality of intake ports at a second distance along the cylinder wall; the cylinder wall includes vertical bridges between adjacent intake ports in a circumferential direction and horizontal bridges between primary and secondary intake ports. The bridges have rounded edges as viewed from an upstream edge and/or from a downstream edge.

The disclosed intake system has been simulated and has been shown to provide an advantageously high scavenging ratio and an air delivery rate at least 50% higher than the prior art while allowing a target swirl ratio to be attained.

BRIEF DESCRIPTION OF THE DRAWINGS

FIG. 5 is an illustration of a cylinder wall showing intake and exhaust ports;

FIG. 6-9 are cross-sectional illustrations through plena according to embodiments of the present disclosure.

DETAILED DESCRIPTION

As those of ordinary skill in the art will understand, various features of the embodiments illustrated and described with reference to any one of the Figures may be combined with features illustrated in one or more other Figures to produce alternative embodiments that are not explicitly illustrated or described. The combinations of features illustrated provide representative embodiments for typical applications. However, various combinations and modifications of the features consistent with the teachings of the present disclosure may be desired for particular applications or implementations. Those of ordinary skill in the art may recognize similar applications or implementations whether or not explicitly described or illustrated.

Figure 4:
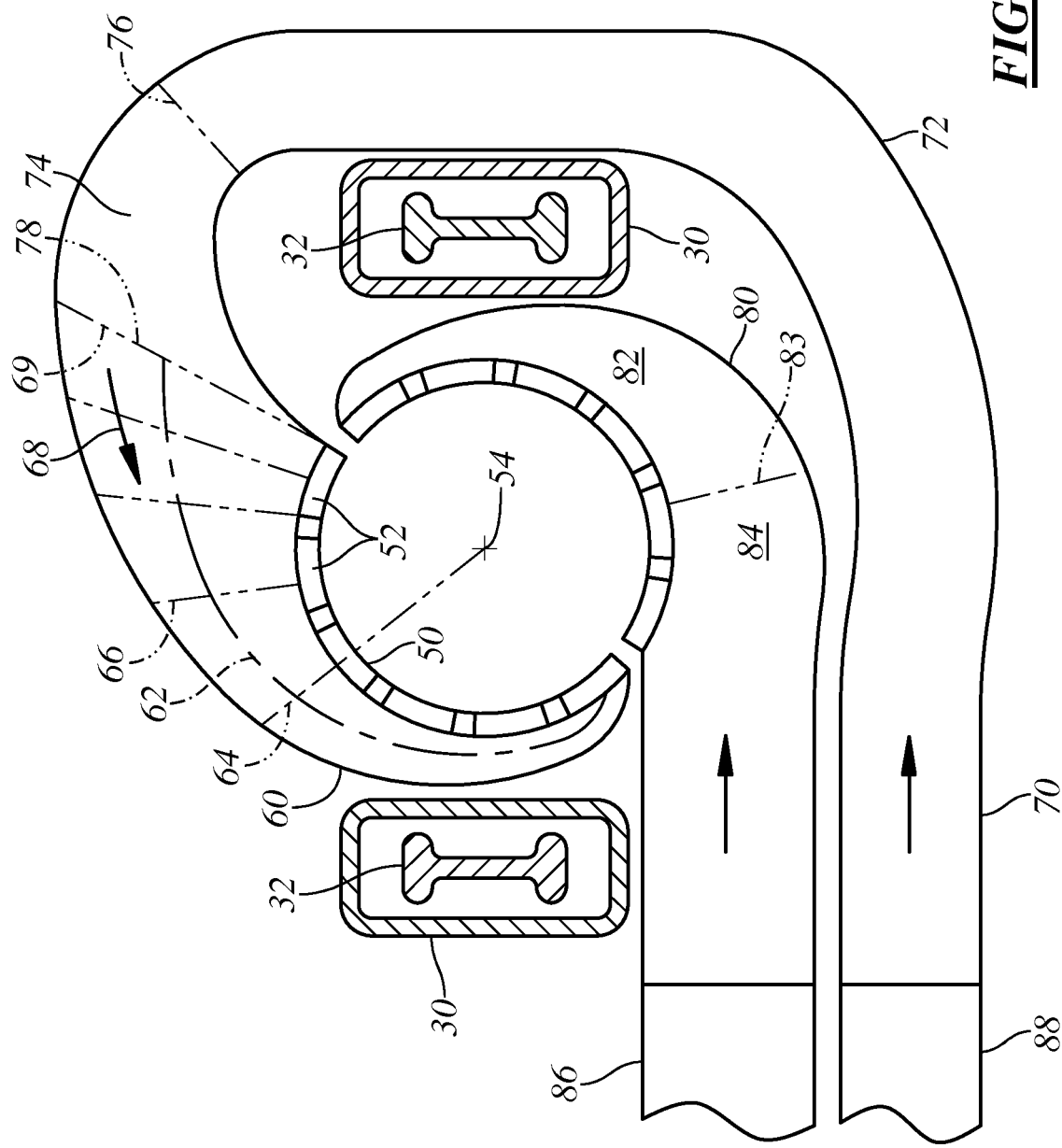
FIG. 4 is a representation of a cross section of an opposed-piston engine taken through the intake ports according to an embodiment of the disclosure.

In FIG. 4, a cross section of the engine intake system illustrates an embodiment of the disclosure in which the intake air delivery system wraps around the intake ports leaving space for the tunnels 30 in which pullrods 32 are housed. A cylinder wall 50 with a central at 54 has a plurality of ports 52 defined therein. A first generally volute-shaped plenum 60 is fluidly coupled to a first portion of intake ports 52. Plenum 60 has a centerline 62 which is the locus of points defined by the geometric center of plenum 60 as taken along cross sections; two such cross sections 64 and 66 are shown with cross sections 64 and 66 intersecting center 54 of cylinder 50. Centerline 62 spirals inwardly as determined along the direction of flow, shown as arrow 68. That is, the radius of curvature of centerline 62 decreases in the downstream direction. It is understood by one skilled in the art that flow in an intake system in an internal combustion engine is unsteady and that momentary flow reversals may occur at certain operating conditions. Herein, the terms upstream, downstream, direction of flow, and the like refer to the predominant direction of flow or the direction of net flow.

The cross-sectional area of plenum 60 decreases along the direction of flow. All flow to the first portion of ports 52 to which plenum 60 is coupled passes through the upstream cross section 69 of plenum 60. However, as the flow enters ports 52, the mass of the gases flowing through plenum 60 decreases. To maintain the desired velocity of the gases flowing in plenum 60, the flow area, i.e., cross-sectional area of plenum 60, decreases in the direction of flow.

Plenum 60 is fluidly connected on the supply side by: an intake pipe 88, an intake runner 70, a supply passageway 72, and a transition section 74 (in order from upstream to downstream). Intake pipe 88 and intake runner have a solid connection, likely via a flange (not shown). The cross-sectional area of runner 70 and passageway 72 are substantially constant along the length. Transition section 74 increases in diameter in the direction of flow. At an upstream end 76 of transition section 74, the cross-sectional area is substantially the same as passageway 72 and at a downstream end 78 of transition section 74, the cross-sectional area is substantially the same as upstream cross section 69 of plenum 60. The compactness of the intake system is more compact by having runner 70 and passageway 72 just large enough to accommodate the greatest flow anticipated with a reasonable pressure drop.

In one embodiment, plenum 60, supply passageway 72, and transition section 74 are formed in the casting of the engine block with intake runner 70 being a pipe external to the casting. In FIG. 4, a dash-dot-dot line at 69/78 delineates plenum 60 from transition 74. However, there is no coupler at this location, but instead a smooth internal surface. The dash-dot-dot line is a contrivance to discuss the geometrical features of the various sections of the continuous intake pipe. It is to be understood that such lines, further examples including cross sections at 64 66, and 83, are only provided for discussion purposes of features of the intake system and do not indicate features.

A second plenum 80 is coupled to a second portion of intake ports 52. In the embodiment in FIG. 4, plenum 80 has a first portion 82 that is substantially volute shaped. Proximate tunnel 30, portion 82 is disturbed slightly from the volute shape of plenum 60. The view in FIG. 4 is a cross-sectional view taken perpendicular to a central axis of cylinder 50. Cross sections taken roughly perpendicularly through plenum 80, however, may reveal that the cross-sectional area provided in plenum 80 supports having a centerline 84 that spirals inwardly and that the cross-sectional area decreases monotonically in the direction of flow. Or, portion 82 may deviate slightly from this shape to accommodate tunnel 30. Plenum 80 also has a second portion 84. Portion 84 does not follow a desired volute shape due to lack of space to accommodate such a volute shape in the proximity of passageway 72. Plenum 80 is fluidly coupled on an upstream side to an intake pipe 86. Plenum 80 does not have a transition section as plenum 60 has, i.e., transition section 74. Thus, intake pipe 86 supplying second plenum 80 is of greater diameter than intake runner 70 that supplies first plenum 60. Alternatively, intake pipe 86 could have a transition section so that an upstream end of the intake pipe 86 is of a cross-sectional area similar to intake runner 70 while having a larger cross-sectional diameter where it couples to plenum 80 or to an intermediary passageway, if provided.

Supply passage 72 is displaced from cylinder wall 50 such that there is space for tunnel 30 between passage 72 and second plenum 80.

A cylinder wall 100 is shown in FIG. 5. Wall 100 has a plurality of exhaust ports 150, a plurality of primary intake ports 152, and a plurality of secondary intake ports 154 defined therein with a horizontal bridge 156 between primary and secondary ports 152, 154 and a vertical bridge 158 between adjacent ports around the circumference. Alternatively, a longer, single set of intake ports, like exhaust ports 150, may be used in place of the primaries and secondaries.

To couple to intake ports, the geometry of plena 60 and 80, as considered in cross section, are flat, at least, on the side that fluidly couples to intake ports. In FIGS. 6 and 7, two example cross sections 164, 166 through a plenum 60 are shown. Cross section 164 interfaces with cylinder wall 150 through intake ports 152 and 154 with horizontal bridge 156 therebetween. Cross section 164 is D shaped, with the flat side at cylinder wall 150 and the rounded portion away from cylinder wall 150. The geometric center of the area enclosed in cross section 164 is indicated at 165. In FIG. 7, cross section 166 is taken through a vertical bridge 168. The D shape of cross section 166 is a wider D with the geometric center 167 displaced farther from cylinder wall 150 than cross section 164 of FIG. 6. It is the locus of such points that defines centerline 62 of FIG. 4. Centerline 62, as it is based on the cross sectional area of the plenum, cannot be defined from a single 2-dimensional cross sectional representation such as shown in FIG. 4. Instead, it is determined by taking a series of cross sections, as through the plenum that intersect the central axis of the cylinder, of which cross sections 164, 166 are examples thereof.

As mentioned above, the shape of plenum 80 is somewhat compromised by other features, such as a tunnel for the pullrod. However, at least some of the compromise can be overcome by careful attention to the cross-sectional shape of the plenum. Example cross sections 190 and 200 are shown in FIGS. 8 and 9, respectively. Cross section 190 is constrained near 192 by a tunnel (not shown) in which pullrod is enclosed. To provide the desired area, cross section 180 bows upward and downward, 194 and 193 respectively, above and below intake ports 152 and 154. Geometric center is shown at 191. Geometric center 204 for cross section 200 at FIG. 9 is displaced away from cylinder wall 150 by including more of the area away outwardly from wall 150 by providing bumping upward and downward in regions 202, 203, respectively. The examples in FIGS. 6-9 are provided as examples only to show alternatives that can be used to accommodate hard limits while still providing the desired area and control over the geometric center. FIGS. 6-9 are not intended to be limiting.

Figure 1:
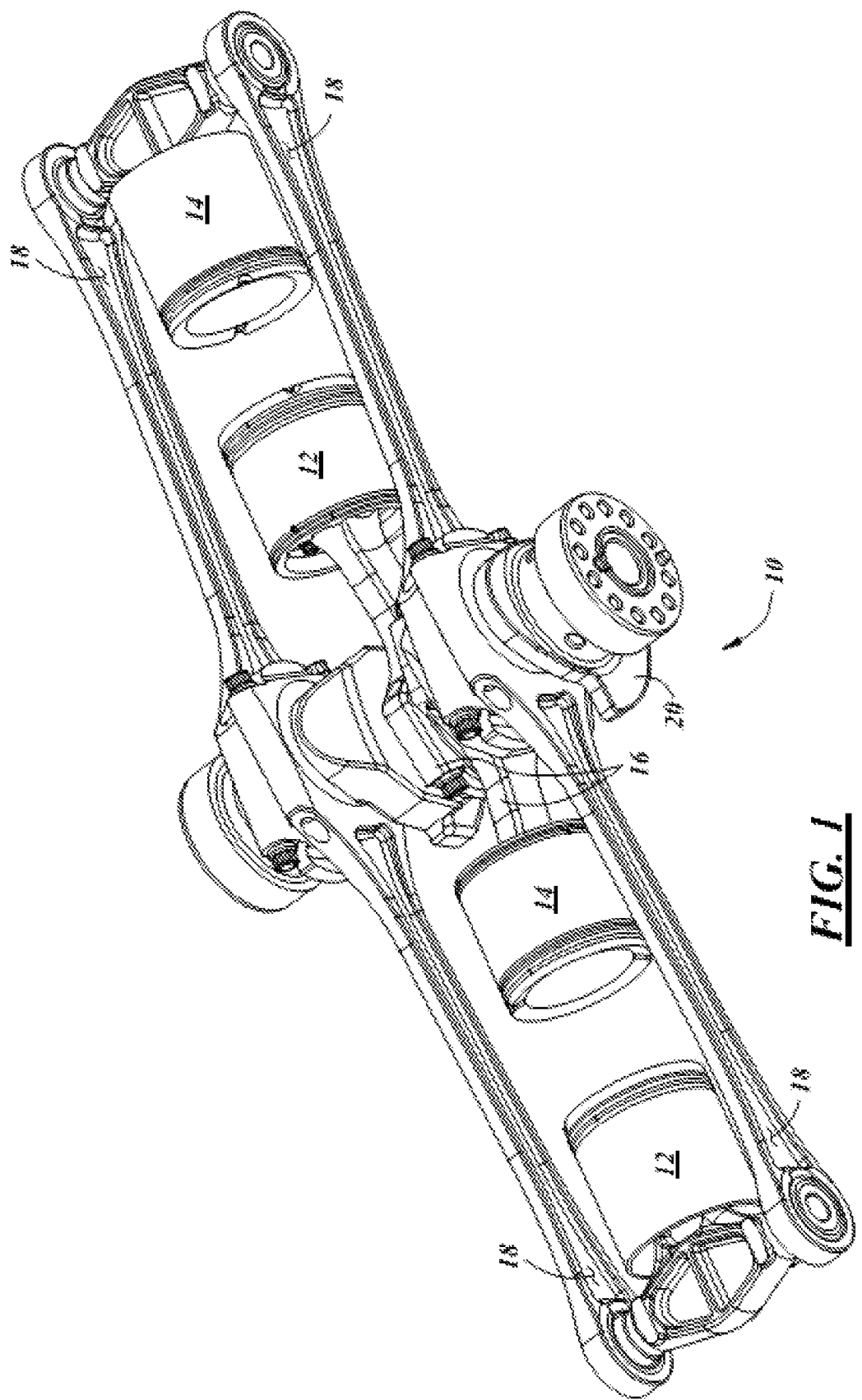
FIG. 1 is an isometric view of an opposed-piston, opposed-cylinder engine.
Figure 2:
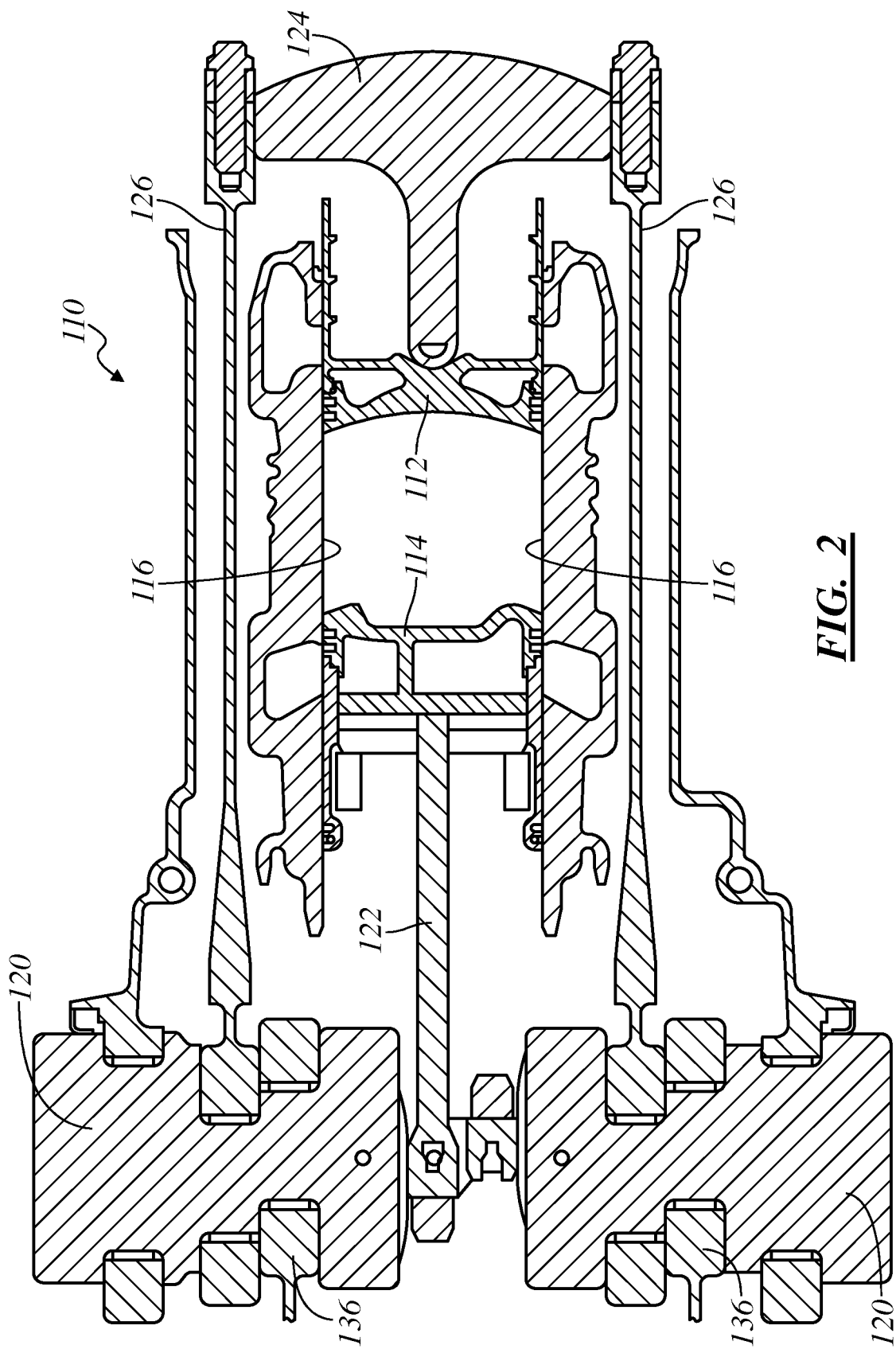
FIG. 2 is a cross-sectional view of a portion of a opposed-piston engine.
Figure 3:
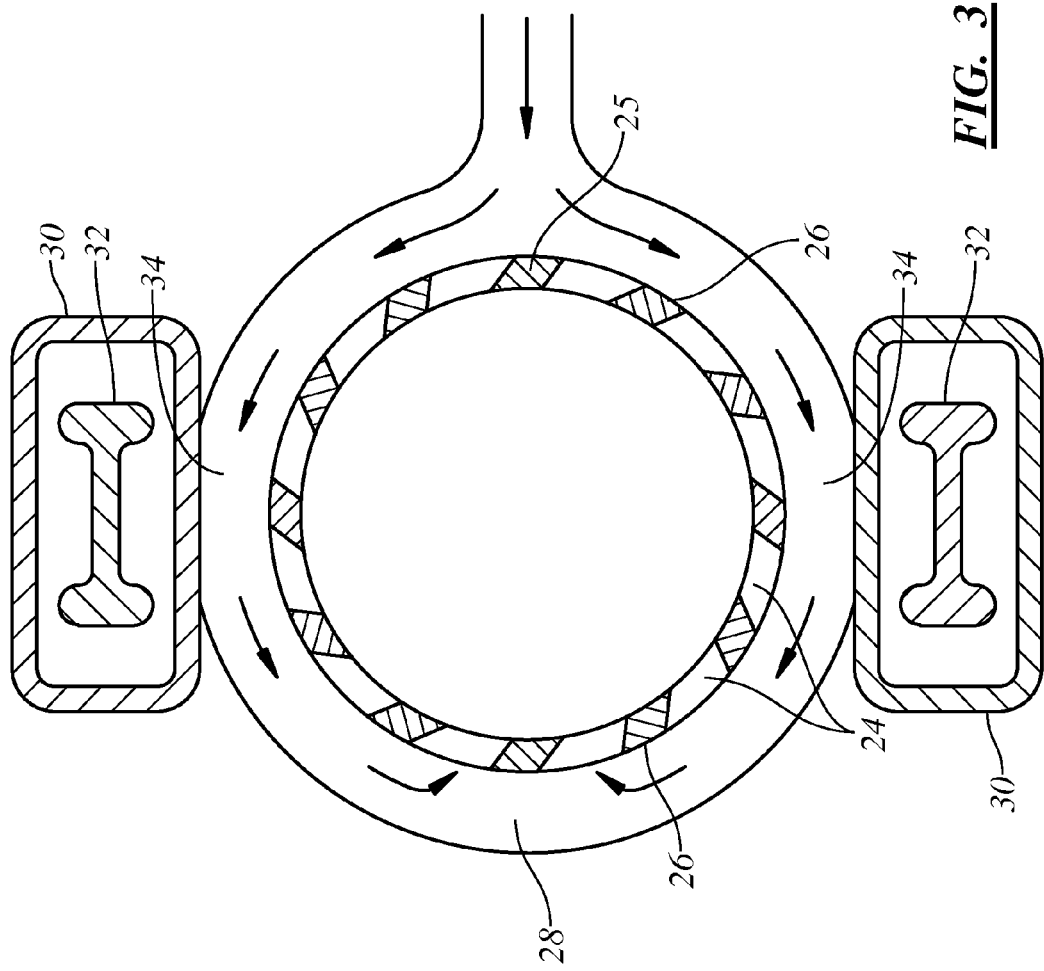
FIG. 3 is a representation of a cross section of an opposed-piston engine taken through the intake ports.

Referring now to FIG. 3, the wall portions between adjacent intake ports 24 are bridges 25. In some engines, bridges 25 may be angled to impart swirl to the incoming gases. Angled ports 24, however, lead to a greater pressure drop compared to straight intake ports 52 such as in FIG. 4. Even with straight ports, the intake system of FIG. 4 yields swirl ratios more than double that of the intake system of FIG. 3 due to the geometry of the plena and the other supply ducts.

Figure 11:
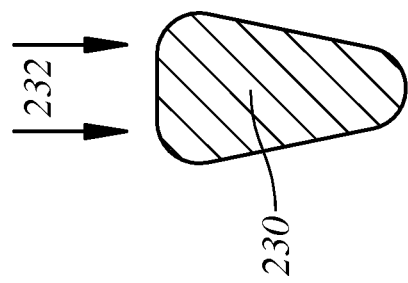
FIG. 11 shows an alternative bridge cross-sectional shape according to an embodiment of the disclosure.
Figure 10:
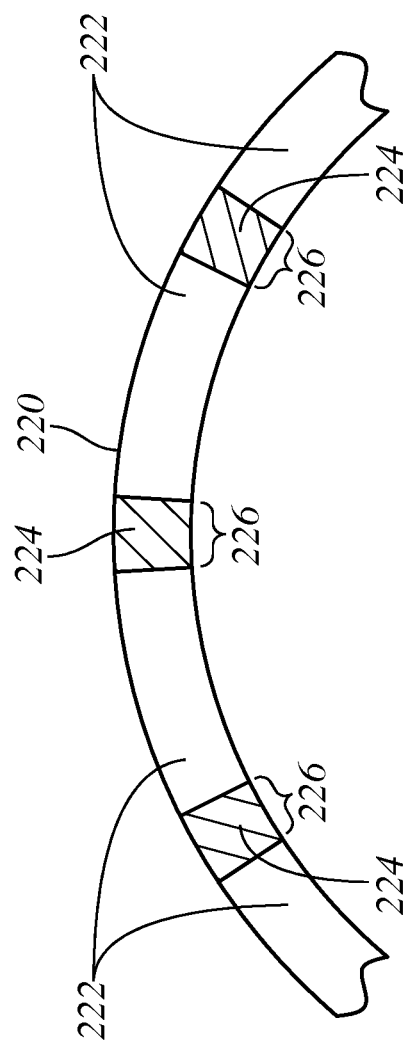
FIG. 10 shows a cross section through bridges between intake ports of a portion of a cylinder wall.

In FIG. 10 a portion of a cylinder wall 10 is shown having bridges 224 between ports 222. Eddies 226 are shed off the square corners of bridges 224. An improved bridge 230 shape is shown in FIG. 11 in which flow 232 leads to little turbulence downstream of bridge 230. By providing the plena as shown in FIG. 4 and careful attention to the shape of the bridges between ports, the flow energy can be used to form large-scale structures such as those that lead to high swirl ratio rather than fine scale structures such as eddies 226. Eddies 226 do provide charge motion. However, such charge motion imparted by eddies 226 dissipate readily and lead to an unwanted temperature rise during the compression stroke. Swirl, on the other hand, persists during the compression stroke and devolves into fine-scale turbulence near the time of ignition to enhance mixing and combustion. Furthermore, dissipation due to the swirl breaking up at the time of ignition leads to a temperature rise at a favorable time in the cycle. The swirl ratio can be enhanced even more by careful design of the bridges between ports. In some embodiments, each bridge is unique to guide the incoming flow to each location effectively.

Plena 60 and 80, as well as passageway 72 and transition section 74, are to lie in the cross section shown in FIG. 4. Alternatively, the plena and associated supply ducts may be arranged helically along the cylinder. In another alternative, more than two volutes are provided to mutually exclusive portions of ports. The embodiment of FIG. 4 shows twelve intake port openings with plenum 60 coupled to six ports and plenum 80 coupled to six ports. In another alternative, one of the plena is coupled to more than half of the ports, i.e., coupled to intake ports in the cylinder wall over more than 180 degrees of circumference.

While the best mode has been described in detail with respect to particular embodiments, those familiar with the art will recognize various alternative designs and embodiments within the scope of the following claims. While various embodiments may have been described as providing advantages or being preferred over other embodiments with respect to one or more desired characteristics, as one skilled in the art is aware, one or more characteristics may be compromised to achieve desired system attributes, which depend on the specific application and implementation. These attributes include, but are not limited to: cost, strength, durability, life cycle cost, marketability, appearance, packaging, size, serviceability, weight, manufacturability, ease of assembly, etc. The embodiments described herein that are characterized as less desirable than other embodiments or prior art implementations with respect to one or more characteristics are not outside the scope of the disclosure and may be desirable for particular applications.

We claim:

1. An internal-combustion engine system, comprising:
a cylinder wall having a plurality of intake ports defined therein at a first distance along the cylinder wall and a plurality of exhaust ports defined therein at a second distance along the cylinder wall;
a crankshaft;
an intake piston disposed within the cylinder wall and coupled to the crankshaft via a connecting rod with the piston adapted to reciprocate in the cylinder in response to rotation of the crankshaft thereby covering and uncovering the intake ports;
an intake system coupled to the intake ports with the intake system including:

a first generally volute-shaped plenum fluidly coupled to a first portion of the intake ports and a locus of geometric centers of cross sections of the first plenum spirals inwardly with a monotonically decreasing radius as considered in the direction of flow; and a second generally volute-shaped plenum fluidly coupled to a second portion of the intake ports and a locus of geometric centers of cross sections of the second plenum spiral inwardly with a generally decreasing radius as considered in the direction of flow, wherein: the first and second plena wrap around an outside of the cylinder wall with a direction of flow induced in the first and second plena having the same rotational direction.

2. The engine system of claim 1 wherein the intake system further includes:
a transition section fluidly coupled to the first plenum and located immediately upstream of the first plenum, the transition section generally increasing in cross-sectional area in the direction of flow.

3. The engine system of claim 2, wherein the intake system further includes:
a supply passageway coupled to the transition section and located immediately upstream of the transition section, the supply passageway having a generally constant cross-sectional area.

4. The engine system of claim 3, further comprising:
a second connecting rod coupled to the intake piston;
a bridge coupled between the intake piston and the connecting rods with the connecting rods disposed diametrically opposite to each other outside the intake piston;
a first connecting rod tunnel housing the first connecting rod; and
a second connecting rod tunnel enclosing housing the second connecting rod wherein the first connecting rod tunnel is disposed between the second plenum and the supply passageway.

5. The engine system of claim 4 wherein the first and second plena, the ports, the cylinder wall, the connecting rod tunnels, the transition section, and the supply passageway are formed in a single casting.

6. The engine system of claim 4 wherein the first and second plena, the transition section, and the supply passageway are generally arranged in a plane perpendicular to a central axis of the cylinder wall or helically along the cylinder wall.

7. The engine system of 1 wherein the first plenum and the second plenum are fluidly decoupled upstream of the intake ports.

8. The engine system of claim 7 wherein a cross sectional shape of the plena includes at least one substantially straight side.

9. The engine system of claim 7 wherein cross-sectional area of the first plenum, as taken in a plane intersecting a central axis of the cylinder wall, decreases in a direction moving toward the cylinder.

10. The engine system of claim 1 wherein between adjacent intake ports are vertical bridges that present an upstream face and a downstream face to gases flowing toward intake ports and at least some of the upstream and downstream faces have generally rounded corners.

11. An intake system for a two-stroke, internal-combustion engine, comprising:
a cylinder having a first set and a second set of intake ports defined therein;
a first volute-shaped plenum fluidly coupled to the first set of intake ports on an upstream side of the intake ports;

a second volute-shaped plenum fluidly coupled to the second set of intake ports on an upstream side of the intake ports wherein cross-sectional area of first and second volutes generally decreases in a direction of flow; the first and second plena are fluidly decoupled upstream of the intake ports; and a direction of flow induced in the first plenum is in the same rotational direction as a direction of flow induced in the second plenum,
the engine further comprising:
a first intake runner fluidly coupled to the first plenum; and
a second intake runner fluidly coupled to the second plenum.

12. The intake system of claim 11 wherein the cross-sectional area is defined at cross sections that intersect a central axis of the cylinder and a centerline of the first plenum spirals inwardly with a monotonically decreasing radius.

13. The intake system of claim 11 wherein the engine has an element proximate the cylinder; and the first intake runner wraps around the element such that the element is located between the cylinder and the first intake runner.

14. The intake system of claim 11 wherein the first and second intake runners are proximate each other with respect to the cylinder.

15. The intake system of claim 13 wherein the element is a tunnel in which a connecting rod is substantially contained.

16. An internal-combustion engine system, comprising:
a cylinder wall having a first set and a second set of intake ports and a plurality of exhaust ports defined therein;
a crankshaft;
an intake piston disposed within the cylinder wall and coupled to the crankshaft via a connecting rod with the piston adapted to reciprocate in the cylinder in response to rotation of the crankshaft thereby covering and uncovering the intake ports;
a first volute-shaped plenum fluidly coupled to the first set of intake ports on an upstream side of the intake ports with a cross-sectional area of the first plenum decreasing monotonically in a direction of flow; and
a second volute-shaped plenum fluidly coupled to the second set of intake ports on an upstream side of the intake ports with a cross-sectional area of the second plenum generally decreasing in a direction of the flow for a portion of the second plenum wherein the first and second plena are fluidly decoupled upstream of the intake ports wherein cross section of the plenum are taken through a central axis of the cylinder wall; the first plenum directs flow in a first rotational direction; the second plenum directs flow in a second rotational direction; and the first and second rotational directions are the same.

17. The engine system of claim 16 wherein between adjacent intake ports are bridges that present an upstream face to gases flowing toward intake ports and the upstream downstream faces are generally rounded.

18. The engine system of claim 16 wherein the plurality of intake ports comprise a primary plurality of intake ports at a first distance along the cylinder wall and a secondary plurality of intake ports at a second distance along the cylinder wall; the cylinder wall includes vertical bridges between adjacent intake ports in a circumferential direction and horizontal bridges between primary and secondary intake ports; and the vertical and horizontal bridges have rounded edges on at least one of an upstream edge and a downstream edge.

19. The engine system of claim 16 wherein a centerline of the first plenum circles inwardly with a monotonically decreasing radius as considered in the direction of flow.

* * * * *